US006421544B1

(12) United States Patent
Sawada

(10) Patent No.: US 6,421,544 B1
(45) Date of Patent: Jul. 16, 2002

(54) RADIO COMMUNICATION SYSTEM, CONTROL METHOD THEREOF, AND RADIO COMMUNICATION TERMINAL

(75) Inventor: Toshinori Sawada, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/175,914

(22) Filed: Oct. 20, 1998

(30) Foreign Application Priority Data

Oct. 24, 1997 (JP) .............................................. 9-292663

(51) Int. Cl.[7] .............................. H04M 1/00; H04Q 7/20
(52) U.S. Cl. ........................ 455/565; 455/418; 455/456; 455/420
(58) Field of Search .......................... 455/565, 418–420, 455/456, 414, 415, 410, 411; 340/825.44

(56) References Cited

U.S. PATENT DOCUMENTS

| | | | | |
|---|---|---|---|---|
| 4,639,726 A | * | 1/1987 | Ichikawa et al. ....... | 340/825.44 |
| 5,224,150 A | * | 6/1993 | Neustein ................ | 340/825.44 |
| 5,442,805 A | * | 8/1995 | Sagers et al. ............... | 455/456 |
| 5,542,103 A | * | 7/1996 | Mottier et al. .............. | 455/566 |
| 5,862,470 A | * | 1/1999 | Damghani ................. | 455/418 |
| 5,940,764 A | * | 8/1999 | Mikami .................... | 455/456 |
| 5,991,614 A | * | 11/1999 | Oura .......................... | 455/404 |
| 6,011,973 A | * | 1/2000 | Valentine et al. ........... | 455/456 |
| 6,052,577 A | * | 4/2000 | Taguchi ...................... | 455/411 |
| 6,064,725 A | * | 5/2000 | Nakanishi ................... | 379/140 |
| 6,108,563 A | * | 8/2000 | Shishino .................... | 455/560 |
| 6,122,486 A | * | 9/2000 | Tanaka et al. ................ | 455/68 |

FOREIGN PATENT DOCUMENTS

JP 5-292011 A 11/1993

OTHER PUBLICATIONS

English language Abstract only.

* cited by examiner

*Primary Examiner*—Nguyen T. Vo
*Assistant Examiner*—Duc Nguyen
(74) *Attorney, Agent, or Firm*—Frishauf, Holtz, Goodman, Langer & Chick, P.C.

(57) ABSTRACT

A CPU built in a portable telephone (or a PHS terminal), receiving the control signal from a doorway base station, detects the present operation mode. If the present mode is the call enable mode, it is assumed that the user has entered a use inhibit area and the operation mode is changed to any one of the sleep #1 mode and sleep #2 mode previously specified, these two modes belonging to the call inhibit mode. The CPU then performs call incoming control or call originating control. In a case where the present mode is the call inhibit mode when the CPU receives the mode change signal, it is assumed that the user has left the use inhibit area and the operation mode is returned to the standby mode, the call enable mode, and call incoming control and call originating control in the present operation mode are performed.

22 Claims, 5 Drawing Sheets

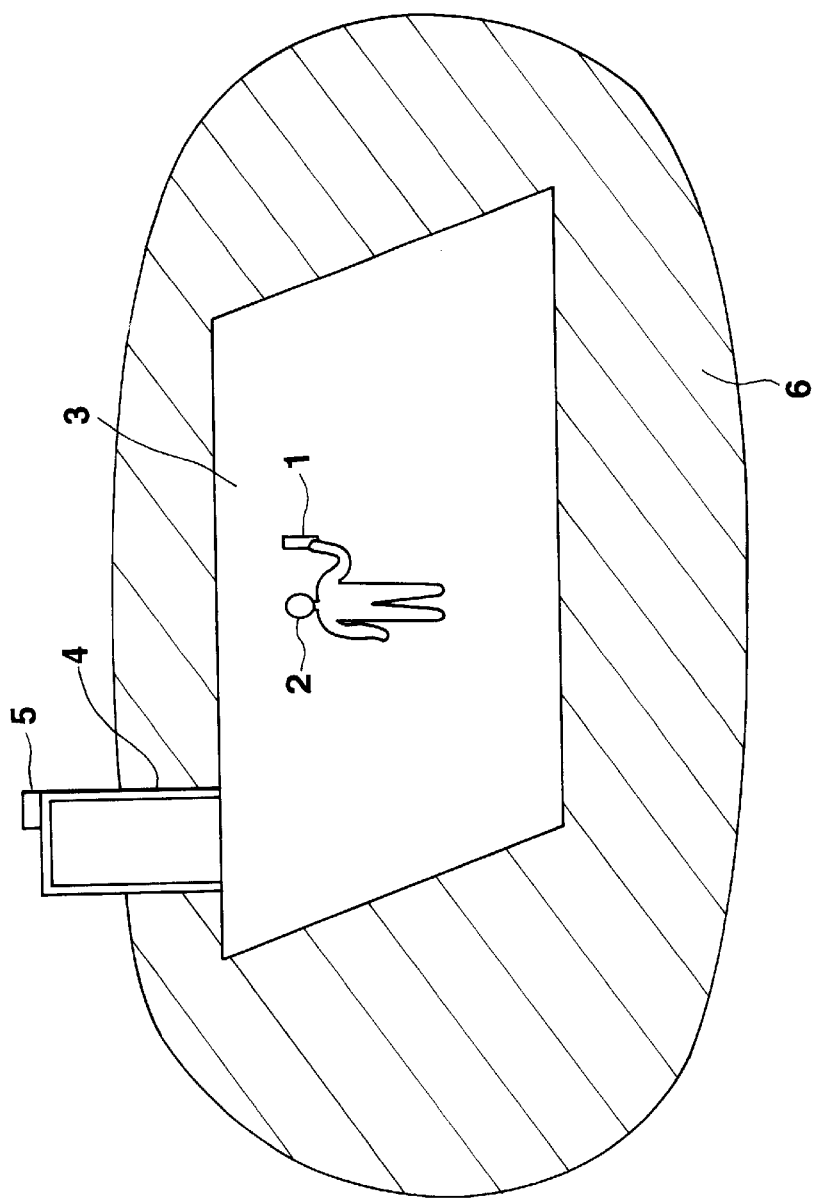

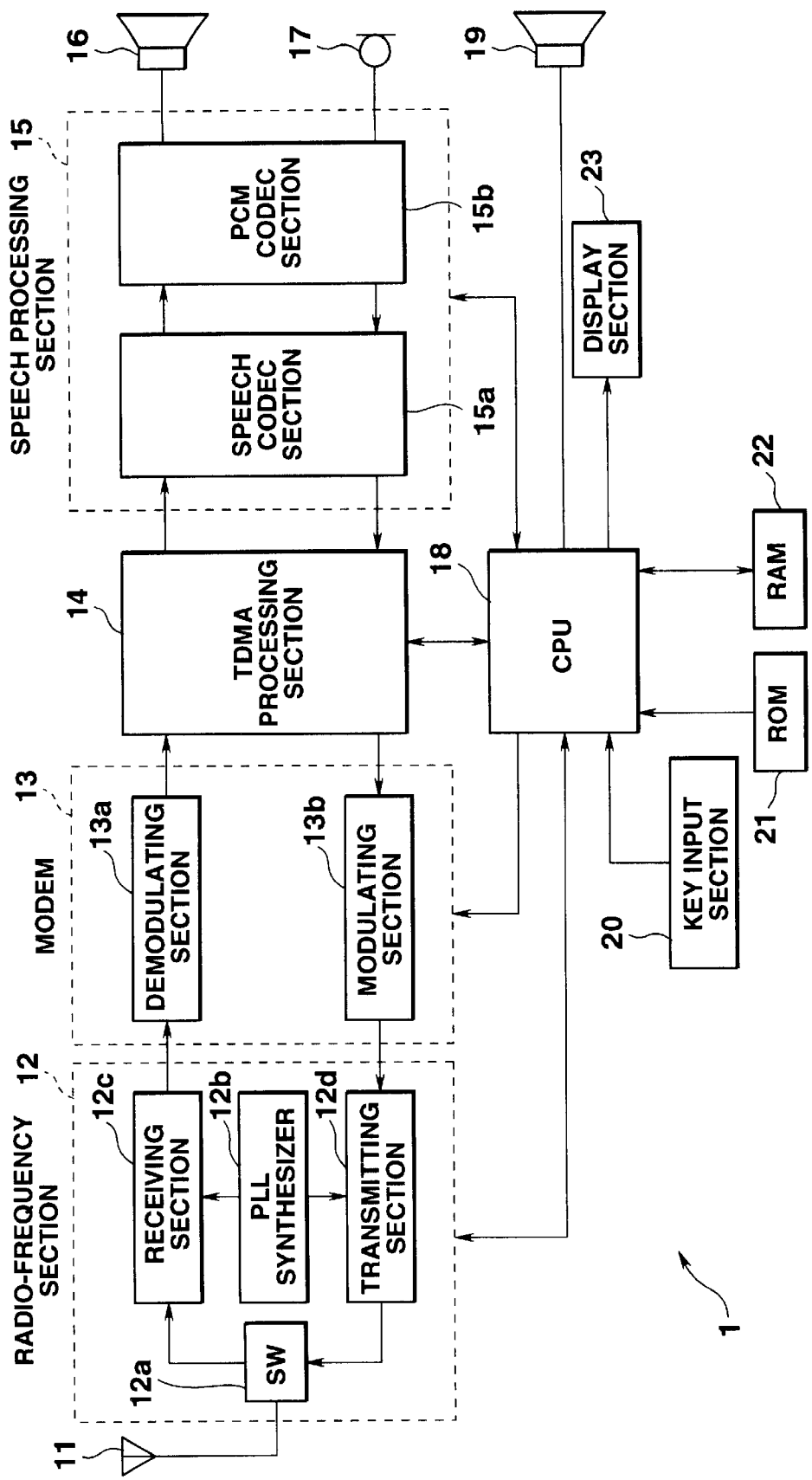

FIG.3A 22a

| MODE | FLAG (0 OR 1) |
|---|---|
| STANDBY MODE | " 1 " |
| BUSY MODE | " 0 " |
| SLEEP #1 MODE | " 0 " |
| SLEEP #2 MODE | " 0 " |

FIG.3B 22b

| MODE | FLAG (0 OR 1) |
|---|---|
| SLEEP #1 MODE | " 1 " |
| SLEEP #2 MODE | " 0 " |

FIG.3C 22c

| CALL INCOMING DATE DATA | CALLING PARTY'S TELEPHONE NUMBER |
|---|---|
| : | : |
| : | : |
| : | : |
| : | : |

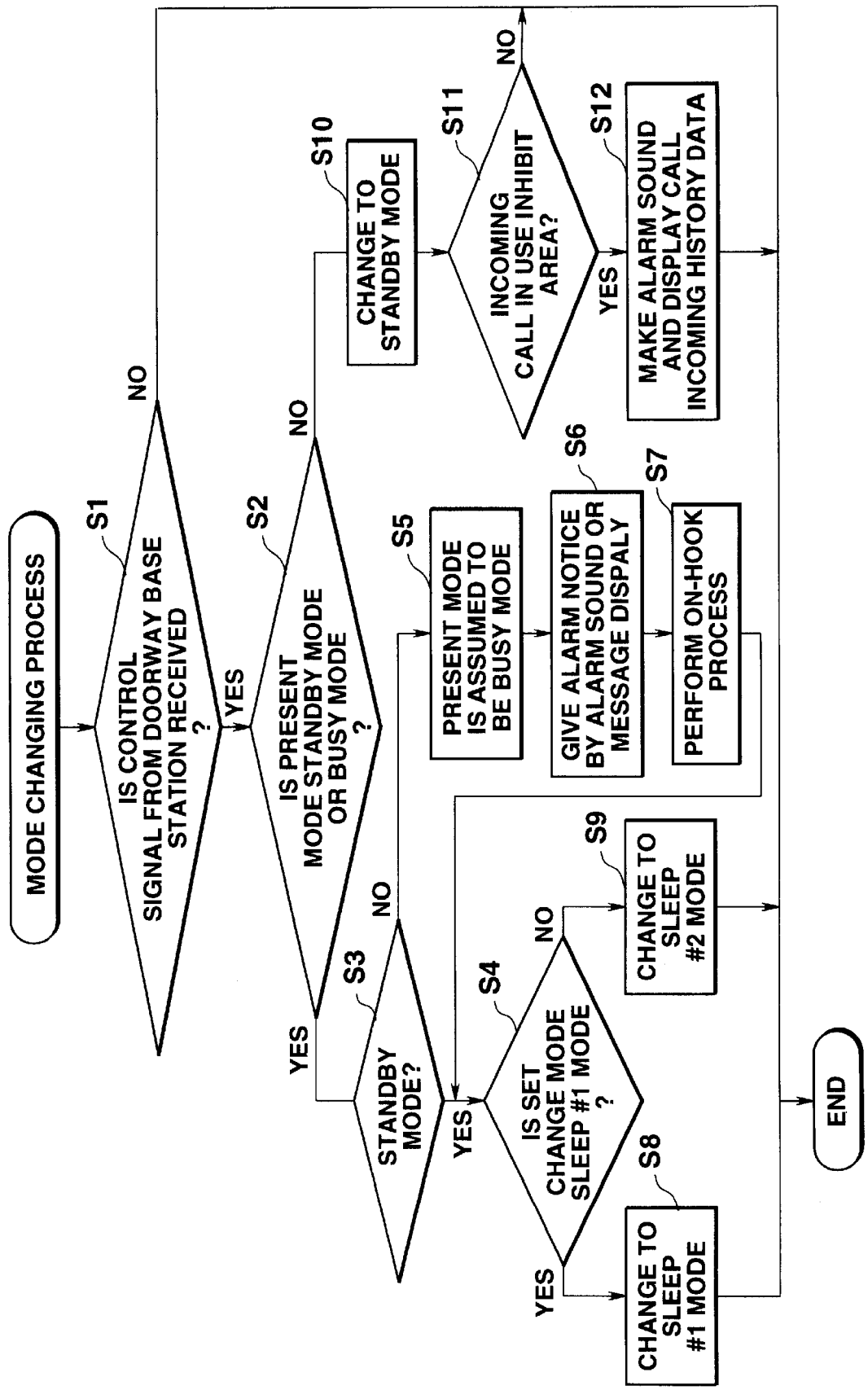

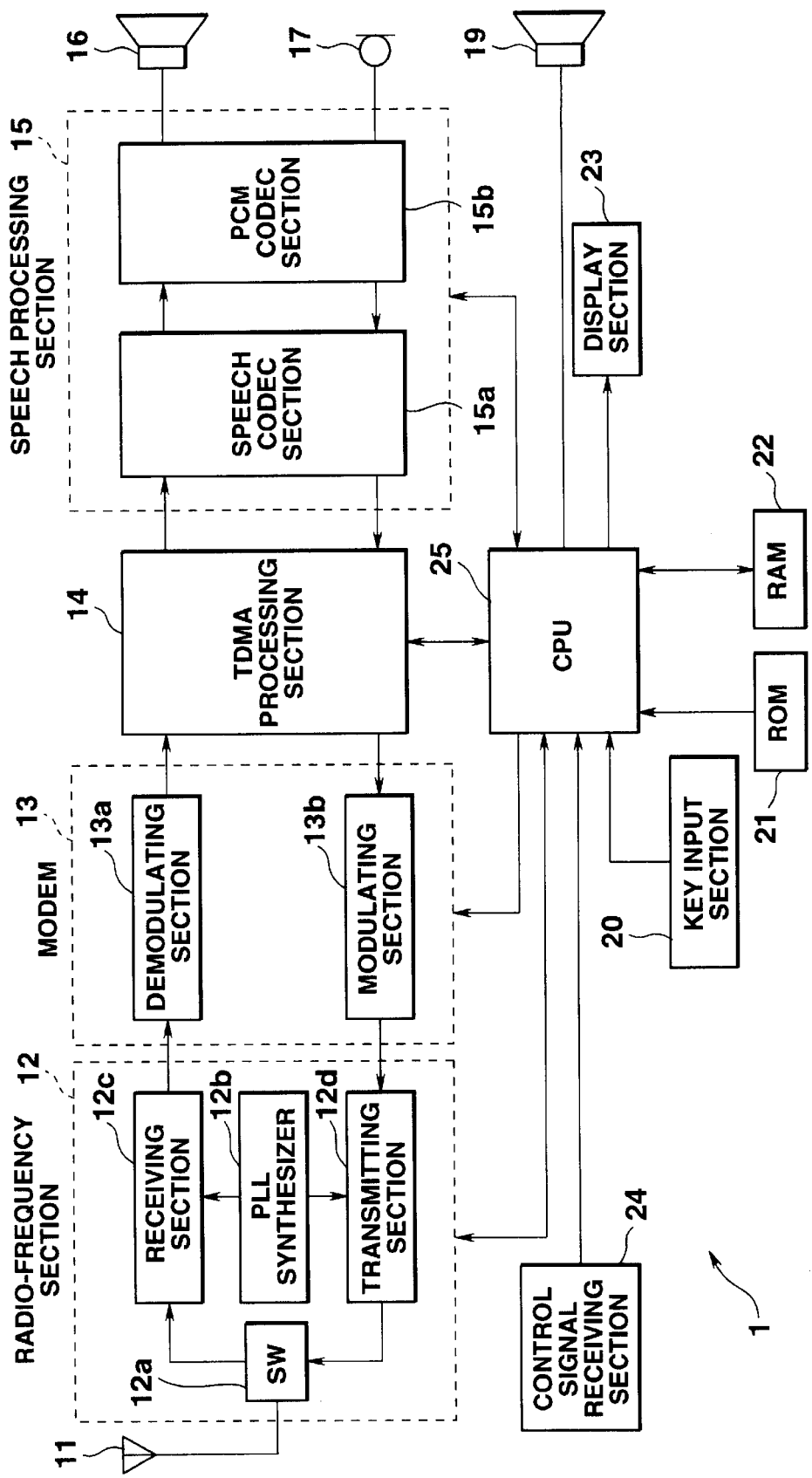

RADIO COMMUNICATION SYSTEM, CONTROL METHOD THEREOF, AND RADIO COMMUNICATION TERMINAL

BACKGROUND OF THE INVENTION

The present invention relates to a radio communication system that controls a call origination, incoming call processing, or communication of a radio communication terminal, a method of controlling the radio communication system, and a radio communication terminal.

This application is based on Japanese Patent Application No. 9-292663, filed Oct. 24, 1997, the content of which is incorporated herein by reference.

In recent years, radio communication systems have progressed rapidly. As the charge for a telephone call has come down, radio communication terminals, including portable telephones and simplified portable telephones known as PHS (personal handy phone), have been popularized remarkably.

The radio communication systems control communication between a communication terminal and a base station, communication between a base station and an exchange for the radio communication system, communication between the exchanges, and communication between the exchange and a database. They enable mobile communication by performing communication between a communication terminal and a base station by radio.

As the built-in CPUs are getting more sophisticated, recent radio communication terminals are made to have more functions and a more compact design to improve the portability.

In this connection, there are now a lot of base stations and radio communication terminals that are compact and easy to carry, which makes it possible to make a call in various places, indoors or outdoors.

On the other hand, speaking by telephone or ringing a calling tone in a public place, such as a theater or a train, may annoy the people there. Radio communication in such a place as a hospital can have an adverse effect on the instruments there. Traditionally, use of radio communication terminals in such public places has been up to users. Specifically, the user himself or herself had to turn off the power supply of the radio communication terminal in a public place and turn on the power supply when leaving the place. However, the user sometimes forgot to turn off the power supply, annoying the people there or having an adverse effect on the instruments nearby. Alternately, forgetting to turn on the power supply, the user suffered inconvenience.

BRIEF SUMMARY OF THE INVENTION

It is, accordingly, an object of the present invention to overcome the disadvantages in the prior art and provide a radio communication system that limits the use of radio communication terminals depending on circumstances.

Another object of the present invention is to provide a method of controlling the above radio communication system.

Further object of the present invention is to provide a radio communication terminal used in the above radio communication system.

The foregoing objects are accomplished by the following radio communication systems, method of controlling the system, and radio communication terminal described in items (1) to (5).

(1) A radio communication system comprising a radio communication terminal, and a base station, wherein the base station transmits a control signal for controlling an operation of the radio communication terminal, and the radio communication terminal comprises communication control means capable of operating in several operation modes, reception means for receiving the control signal from the base station, and operation mode changing means for changing the operation mode of the communication control means based on the control signal received by the reception means.

In the radio communication system, the base station may transmit the control signal to the radio communication terminal crossing a boundary of a use inhibit area where use of the radio communication terminal is inhibited, the communication control means is capable of operating in a call enable mode and a call inhibit mode, and the operation mode changing means changes the operation mode to the call inhibit mode in a case where the operation mode of the communication control means is the call enable mode when the reception means receives the control signal and changes the operation mode to the call enable mode in a case where the operation mode of the communication control means is the call inhibit mode when the reception means receives the control signal. It is desirable that the base station should be provided at a doorway to the use inhibit area.

With such a configuration, it is possible to inhibit making a call reliably to any radio communication terminal that has entered the use inhibit area. Moreover, it is possible to return every radio communication terminal that has left the use inhibit area from the call inhibit state to the call enable state reliably.

This saves the user the trouble of turning off the power supply of the radio communication terminal in a public place and turning on the power supply when leaving the place. Consequently, the user will never fail to turn off the power supply in a public place, which eliminates the possibility of annoying the people there or having an adverse effect on the instruments nearby. Moreover, the user will never experience the inconvenience of being unable to make a call because of forgetting to turn on the power supply.

It is desirable that the radio communication terminal should comprise storage means for storing call incoming history data including information on the call originating party and information on the call originating date, and the call inhibit mode of the communication control means includes a first operation mode in which the radio communication terminal is inhibited from originating a call, neither a call incoming informing process nor the process of establishing a speech channel between the base station and the radio communication terminal is performed at the time of call incoming, and the call incoming history data is stored in the storage means.

With this configuration, because the radio communication terminal can store the call incoming data even when it cannot make a call in the use inhibit area, the stored data enables the user to check information on an incoming call for the user in the use inhibit area.

It is desirable that the call inhibit mode of the communication control means should include a second operation mode in which call originating and incoming call reception are inhibited and only the control signal can be received.

With this configuration, it is possible to completely shut off the radio waves radiated from the radio communication terminal in the use inhibit area.

It is desirable that the radio communication terminal should comprise display means, the operation mode changing means changes the operation mode to the call inhibit mode in a case where the operation mode of the communication control means is the call enable mode when the reception means receives the control signal, and the communication control means displays a message or a mark indicating that the terminal is within the use inhibit area, continuously on the display means or temporarily on the display means by a call originating operation during the time until the reception means receives the control signal again.

With this configuration, because a message or a mark indicating that the terminal is within the use inhibit area is displayed on the display means, this enables the user to easily know that the user has entered the use inhibit area and the operation mode is changed to the call inhibit mode.

It is desirable that the radio communication terminal should comprise informing means, the communication control means causes the informing means to give an alarm notice that the terminal has entered the use inhibit area in a case where the terminal is busy when the reception means receives the control signal, and then performs a call terminating process, and the operation mode changing means changes the operation mode of the communication control means to the call inhibit mode.

Such a configuration enables the user to easily know that the user has entered the use inhibit area and consequently the call is going to be interrupted.

It is desirable that the radio communication terminal should comprise informing means, the operation mode changing means changes the operation mode to the call enable mode in a case where the operation mode of the communication control means is the call inhibit mode when the reception means receives the control signal, and the communication control means reads the call incoming history data from the storage means and causes the informing means to notify the contents of the data when there has been an incoming call in the call inhibit mode.

Such a configuration saves the user the trouble of turning on the power supply of the radio communication terminal again when leaving the use inhibit area. Because the informing means notifies the user of the call incoming history in the use inhibit area when the user is leaving the inhibit area, the user can know information on the incoming call for the user quickly.

(2) A radio communication system comprises a radio communication terminal, a base station, and position detecting means for detecting the position of the radio communication terminal, wherein the position detecting means detects the position of the radio communication terminal, the base station transmits a control signal for controlling an operation of the radio communication terminal, and the radio communication terminal comprises communication control means capable of operating in several operation modes, reception means for receiving the control signal from the base station, and operation mode changing means for changing the operation mode of the communication control means based on the control signal received by the reception means, the base station transmitting a control signal for specifying the operation mode of the communication control means when the position detecting means detects that the radio communication terminal is within the use inhibit area.

With such a configuration, whether the radio communication terminal is in the use inhibit area can be judged and the base station can send a control signal to the radio communication terminal in the area to change the operation mode of the terminal to a specified operation mode. This saves the user the trouble of turning on and off the power supply of the radio communication terminal. In addition, the feature prevents the user from forgetting to turn off the power supply, which eliminates the possibility of annoying the people around the user or having an adverse effect on the instruments nearby. Moreover, the user will never experience the inconvenience of being unable to make a call because of forgetting to turn on the power supply.

(3) A method of controlling a radio communication system comprising a radio communication terminal and a base station, the method comprising the steps of transmitting from the base station to the radio communication terminal a control signal for controlling an operation of the radio communication terminal crossing a boundary of a use inhibit area where use of the radio communication terminal is inhibited, and changing an operation mode of the radio communication terminal to a call inhibit mode in a case where its operation mode is a call enable mode when the radio communication terminal receives the control signal and changing the operation mode to the call enable mode when its operation mode is the call inhibit mode when it receives the control signal.

With such a control method, any radio communication terminal that has entered the use inhibit area can be inhibited reliably from making a call. Furthermore, every radio communication terminal that has left the use inhibit area can be returned reliably from the call inhibit state to the call enable state.

This saves the user the trouble of turning off the power supply of the radio communication terminal in a public place and turning on the power supply when leaving the place. Consequently, the user will never fail to turn off the power supply in a public place, which eliminates the possibility of annoying the people there or having an adverse effect on the instruments nearby. Moreover, the user will never experience the inconvenience of being unable to make a call because of forgetting to turn on the power supply.

(4) A radio communication terminal comprising communication control means capable of operating in several operation modes, reception means for receiving a control signal from a base station, and operation mode changing means for changing an operation mode of the communication control means based on the control signal received by the reception means.

With the radio communication terminal, the operation mode can be changed by only receiving the control signal from the base station. This saves the user the trouble of changing the operation mode of the radio communication terminal.

It is desirable that the communication control means should be capable of operating in a call enable mode in which call originating and incoming call reception are allowed and a call inhibit mode in which call originating is inhibited, and the operation mode changing means changes the operation mode to the call inhibit mode in a case where the operation mode of the communication control means is the call enable mode when the reception means receives the control signal and changes the operation mode to the call enable mode in a case where the operation mode of the communication control means is the call inhibit mode when the reception means receives the control signal.

With such a configuration, any radio communication terminal that has entered the use inhibit area can be inhibited reliably from making a call. Furthermore, every radio communication terminal that has left the use inhibit area can be returned reliably from the call inhibit state to the call enable state.

This saves the user the trouble of turning off the power supply of the radio communication terminal in a public place and turning on the power supply when leaving the place. Consequently, the user will never fail to turn off the power supply in a public place, which eliminates the possibility of annoying the people there or having an adverse effect on the instruments nearby. Moreover, the user will never experience the inconvenience of being unable to make a call because of forgetting to turn on the power supply.

It is desirable that the radio communication terminal should further include storage means for storing call incoming history data including information on a call originating party and information on a call originating date, wherein the call inhibit mode of the communication control means includes a first operation mode in which the radio communication terminal is inhibited from originating a call, neither a call incoming informing process nor the process of establishing a speech channel between the base station and the radio communication terminal is performed at the time of call incoming, and the call incoming history data is stored in the storage means.

Furthermore, it is desirable that the call inhibit mode of the communication control means should include a second operation mode in which call originating and incoming call reception are inhibited and only the control signal can be received.

With such a configuration, even when the terminal is unable to make a call in the call inhibit area, if the operation mode is the first operation mode, the radio communication terminal will be able to store the call incoming data, enabling the user to check information on the incoming call for the user. If the operation mode is the second operation mode, the radio waves radiated from the radio communication terminal can be shut off completely in the use inhibit area.

It is desirable that the radio communication terminal should further comprise display means, and in which the operation mode changing means changes the operation mode to the call inhibit mode in a case where the operation mode of the communication control means is the call enable mode when the reception means receives the control signal, and the communication control means displays a message or a mark indicating that the terminal is within the use inhibit area, continuously on the display means or temporarily on the display means by a call originating operation during the time until the reception means receives the control signal again.

With this configuration, because a message or a mark indicating that the terminal is within the use inhibit area is displayed on the display means, this enables the user to easily know that the user has entered the use inhibit area and communication control is in progress.

It is desirable that the radio communication terminal should further comprise informing means, and in which the communication control means causes the informing means to give an alarm notice that the terminal has entered the use inhibit area in a case where the terminal is busy when the reception means receives the control signal, and the operation mode changing means changes the operation mode of the communication control means to the call inhibit mode.

Furthermore, the communication control means may perform a call terminating process after causing the informing means to give the alarm notice.

Such a configuration enables the user to easily know that the user has entered the use inhibit area and consequently the call is going to be interrupted.

It is desirable that the radio communication terminal should further comprise informing means, and in which the operation mode changing means changes the operation mode to the call enable mode in a case where the operation mode of the communication control means is the call inhibit mode when the reception means receives the control signal, and the communication control means reads the call incoming history data from the storage means and causes the informing means to notify the contents of the data when there has been an incoming call in the call inhibit mode.

Such a configuration saves the user the trouble of turning on the power supply of the radio communication terminal again when leaving the use inhibit area. Because the informing means notifies the user of the call incoming history in the use inhibit area when the user is leaving the inhibit area, the user can know information on the incoming call for the user quickly.

Furthermore, it is desirable that the radio communication terminal should further comprise recording/reproducing means, and in which the call inhibit mode of the communication control means includes a third operation mode in which call originating is inhibited, neither a call incoming informing process nor a process of establishing a speech channel between the base station and the radio communication terminal is performed at the time of incoming a call, the call incoming history data is stored in the storage means, and the recording/reproducing means records a speech message.

Such a configuration enables the user not only to see the call incoming history in the use inhibit area but also to listen to a speech message when leaving the area.

(5) A radio communication system comprising a radio communication terminal and a base station, wherein the base station comprises means for detecting a position of the radio communication terminal, means for determining whether the radio communication terminal is in a use inhibit area, and means for recording call incoming history data indicating information on a call originating party and date and time of a call origination instead of calling the radio communication terminal when there has been an incoming call to the radio communication terminal which is determined to be within the use inhibit area.

Such a configuration prevents the radio waves from radiating in the use inhibit area and therefore from having an adverse effect on the instruments nearby and enables the call incoming history to be recorded.

Additional objects and advantages of the present invention will be the forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 shows a schematic configuration of a communication system according to the present invention;

FIG. 2 is a circuit block diagram of the PHS terminal of FIG. 1 in the first embodiment;

FIGS. 3A, 3B, and 3C show tables stored in the RAM of FIG. 2;

FIG. 4 is a flowchart for an operation mode changing process executed by the CPU of FIG. 2; and FIG. 5 is a circuit block diagram of the PHS terminal of FIG. 1 according to a second embodiment of the present invention.

DETAILED DESCRIPTION OF THE INVENTION

Hereinafter, embodiments of a radio communication system according to the present invention will be described in detail by reference to FIGS. 1 to 5.

While in the embodiments that follow, the present invention is applied to PHS, it may be applied to a other portable telephones.

First Embodiment

FIG. 1 shows a schematic configuration of a radio communication system according to a first embodiment of the present invention.

The figure shows that a PHS terminal user (hereinafter, referred to as a user) 2 carrying a portable telephone (hereinafter, referred to as a PHS terminal) 1 has entered a PHS terminal use inhibit area 3 from a doorway 4. The use inhibit area is a public place, such as a theater or a hospital. At the top of the doorway 4, a doorway base station 5 for a radio communication is provided.

A cover area 6 shows a range in which the doorway base station 5 can transmit and receive an ordinary speech signal via a radio channel. The doorway base station 5 has not only the function of an ordinary base station but also the function of constantly transmitting a control signal to a PHS terminal 1 passing through the doorway 4 of the use inhibit area 3 within the cover area 6. It is not always necessary for the doorway base station 5 to have the two functions. Only a control signal transmitter may be provided on the doorway 4. In this case, an ordinary base station need not be provided on the doorway 4. The place where the base station with the control signal transmitting function is provided is not limited to the doorway 4. The base station may be provided in any place, provided that the base station has directivity that enables the control signal to be transmitted to a terminal passing through the doorway 4. The control signal may have either the same frequency band as or a different frequency band from that of the signal transmitted from an ordinary communication business radio base station or a private base-station. In the embodiment, the control signal and the speech signal have the same frequency.

The PHS terminal 1 can operate in a plurality of operation modes. They include a busy mode, a standby mode, a sleep #1 mode, and a sleep #2 mode. The busy mode and standby mode belong to a call enable mode that enables originating a call and receiving an incoming call. The sleep #1 mode and sleep #2 mode belong to a call inhibit mode that disables at least originating a call.

In any of the modes, the PHS terminal can receive the control signal transmitted from the doorway base station 5.

The busy mode is an operation mode in which the PHS terminal 1 is in communication. Specifically, the busy mode is started after a speech channel has been established between the terminal 1 and the base station 5 and enables a communication process to be performed.

The standby mode is a mode in which the PHS terminal 1 performs a call origination and incoming call reception waiting processes until the terminal 1 has succeeded in establishing a speech channel.

The sleep #1 mode is a mode in which the call origination from the PHS terminal 1 is made impossible and which allows only an incoming call to the PHS terminal 1 to be subjected to a specific communication process. Specifically, the sleep #1 mode is a mode in which neither the notifying of incoming call nor the establishing of a speech channel is effected when there has been an incoming call from the base station and the terminal 1 is allowed to receive only call incoming history information (including incoming call date and the calling party's telephone number) and store it in a specific storage device. Therefore, speech communication as a result of call originating or incoming call receiving is impossible in the sleep #1 mode.

The sleep #2 mode is a mode in which neither call originating nor incoming call receiving at the PHS terminal 1 is allowed and the terminal 1 is allowed to perform only the process of waiting for the control signal from the doorway base station 5 (mainly the process of pulling in a control channel).

FIG. 2 is a circuit block diagram of the PHS terminal 1 shown in FIG. 1.

FIGS. 3A to 3C are tables used in controlling the operation of the PHS terminal 1.

The receiving function and transmitting function of the control system in the embodiment will be explained by reference to the block diagram of FIG. 2 and the tables of FIGS. 3A to 3C.

(Control System With Regard to Receiving Function)

First, the control system with regard to the receiving function will be explained.

As shown in FIG. 2, the PHS terminal 1 comprises an antenna 11, a radio-frequency section 12, a modem 13, a TDMA processing section 14, a speech processing section 15, a reception speech speaker 16, a microphone 17, a CPU 18, a speaker 19, a key input section 20, a ROM 21, a RAM 22, and a display section 23.

The antenna 11 transmits and receives a transmission signal and a reception signal in a specific radio-frequency band transmitted between the PHS terminal 1 and a telecommunications business base station or a private communication base station. In the first embodiment, the control signal from the doorway base station 5 has the same frequency band as that of each of the speech signal transmitted from the telecommunications business base station or the private communication base station. The antenna 11 receives the transmission signal (including a control signal) from the doorway base station 5.

The radio-frequency section 12 comprises switch (SW) 12a, a PLL synthesizer 12b, a receiving section 12c, and a transmitting section 12d.

The switch 12a switches in a time-division manner and connects the antenna 11 to the receiving section 12c and transmitting section 12d alternately, thereby outputting the reception signal (including a control signal) from the antenna 11 to the receiving section 12c.

The PLL (Phase-Locked Loop) synthesizer 12b effects local oscillation at the frequency the by the CPU 18 and outputs the local oscillation signal to the receiving section 12c and transmitting section 12d.

The receiving section 12c mixes the reception signal (including a control signal) supplied from the antenna 11 via the switch 12a with the local oscillation signal supplied from the PLL synthesizer 12b to frequency-convert the reception radio-frequency signal into an IF (Intermediate Frequency) signal and outputs the converted signal to the modem 13.

The modem 13 comprises a demodulating section 13a and a modulating section 13b and performs a phase modulation/demodulation process.

The demodulating section 13a phase-demodulates the IF signal from the receiving section 12c by a π/4 shift keying (QPSK) scheme to extract IQ data and outputs them in the form of a data string to the TDMA processing section 14.

The TDMA (Time Division Multiple Access) processing section 14 extracts a slot of data from a frame in the data string from the demodulating section 13a with a specific timing. After descrambling the wiretapping prevention scramble, the TDMA processing section 14 outputs the control data in the extracted slot of data to the CPU 18 and the speech data in the extracted slot of data to the speech processing section 15.

The speech processing section 15 comprises a speech codec section 15a and a PCM codec section 15b.

The speech codec section 15a performs the process of compressing and expanding the speech data (digital data). It encodes and decodes the speech data by an ADPCM (Adaptive Differential PCM) scheme using adaptive prediction and adaptive quantization. Specifically, the speech codec section 15a expands the ADPCM speech data supplied from the TDMA processing section 14 by decoding the ADPCM speech data into PCM speech data and outputs the PCM speech data to the PCM codec section 15b.

The PCM (Pulse Code Modulation) codec section 15b performs an analog/digital conversion on the speech data. Specifically, the PCM codec section 15b converts the PCM speech data supplied from the speech codec section 15a into an analog speech signal and outputs the converted analog signal to the reception speaker 16.

The reception speaker 16 converts the analog speech signal from the PCM codec section 15b into audible speech output.

The CPU (Central Processing Unit) 18 controls each section of the PHS terminal 1 according to the various control programs stored in the ROM 21.

After the power supply key in the key input section 20 has been turned on and the initial process including initialization has been completed, the CPU 18 performs an incoming call reception control process or a call origination control process.

When receiving the control signal from the doorway base station 5, the CPU 18 changes the operation mode and performs communication control using the tables stored in the RAM 22, which will be explained later.

Furthermore, as will be explained later, in a case where there has been an incoming call for the PHS terminal 1 when it is in the use inhibit area 3, the CPU 18 stores the date of the incoming call and the telephone number of the calling party into the RAM 22 as call incoming history data. Then, when the user of the PHS terminal 1 leaves the use inhibit area 3, the CPU 18 rings the alarm to let the user know that there has been an incoming call when he was in the use inhibit area and reads the call incoming history data about the incoming call from the RAM 22 and displays it on the display section 23.

The speaker 19, receiving a ringer signal from the CPU 18 at the time of call incoming, is driven to produce a ringing tone. It also informs the user of low battery or other cautions in sound.

The key input section 20 has various keys including a call key, a numeric key pad, and a playback key and outputs various operation signals corresponding to the key operations to the CPU 18.

The ROM (Read Only Memory) 21 stores various control programs needed for the CPU 18 to control each section of the PHS terminal 1. The control programs include a program for changing the operation mode, which will be explained later. The various control programs are stored in the ROM 21 in the form of program code that the CPU 18 can read and execute.

The RAM (Random Access Memory) 22 is a storage device that is connected to the CPU 18 and temporarily stores various data items used when the CPU 18 performs control processing. In the RAM 22, the tables shown in FIGS. 3A to 3C are stored.

FIG. 3A shows a present mode table 22a.

In the present mode table 22a, a flag data item "1" or "0" is stored for each of the aforementioned four modes. A flag data item "1" is the for the present operation mode and a flag data item "0" is the for the other operation modes. FIG. 3A shows a present mode table 22a when the operation mode is the standby mode.

FIG. 3B shows a user-specified mode table 22b.

In the user-specified mode table 22b, a flag data item "1" or "0" is stored in each of the sleep #1 mode and sleep #2 mode. The user can specify in advance whether sleep #1 mode or sleep #2 mode is the change destination mode to which the mode is to be changed by the control signal received from the doorway base station 5 when entering the use inhibit area 3. A flag data item "1" is the for the specified change-destination mode and a flag data item "0" is set for the other operation modes. FIG. 3B shows a user-specified mode table 22b for which the sleep #1 mode has been specified for the change destination.

FIG. 3C is a call incoming history table 22c.

In the call incoming history table 22c, when there has been an incoming call for the PHS terminal 1 set in the sleep #1 mode, the incoming call data is caused to correspond to the calling party's telephone number data and they are stored as call incoming history data.

The display section 23 comprises a liquid-crystal display panel and displays a message or a mark indicating that the PHS terminal is within the use inhibit area 3 while it is in the use inhibit area 3. In addition, when there has been an incoming call while the PHS terminal is within the use inhibit area 3 and set in the sleep #1 mode, the display section 23 displays the stored call incoming history data. Because the call incoming history data in the call incoming history table 22c may be deleted after it has been displayed, it is cleared when the sleep #1 mode starts to operate next time.

(Control System With Regard to Transmitting Function)

The control system with regard to the transmitting function will be explained.

The microphone 17 converts transmission speech into an analog speech signal and outputs the signal to the PCM codec section 15b of the speech processing section 15.

The PCM codec section 15b converts the analog speech signal supplied from the microphone 17 into a digital speech signal and outputs the digital signal to the speech codec section 15a as PCM speech data.

The speech codec section 15a encodes the PCM speech data supplied from the PCM codec section 15b into ADPCM speech data, compresses the ADPCM speech data, and outputs the compressed signal to the TDMA processing section 14.

The TDMA processing section 14 produces a slot of data by adding the control data from the CPU 18 to the speech data supplied from the speech codec section 15a and scrambles the data. Thereafter, the TDMA processing section inserts the slot of data into a frame with a specific timing and outputs the resulting signal to the modulating section 13b.

The modulating section 13b creates IQ data from the data string supplied from the TDMA processing section 14, phase-modulates the IQ data by a π/4 phase shift keying (QPSK) scheme, and then outputs the modulated data to the transmitting section 12d.

The transmitting section 12d mixes the modulated data supplied from the modem 13 with the local call oscillation signal supplied from the PLL synthesizer 12b to convert the modulated signal into a radio-frequency (RF) signal, and radiates the RF signal from the antenna 11 via the switch 12a with the transmission timing specified by the CPU 18.

Control Sequence

Control Sequence for Waiting (Standby Mode)

The base station periodically transmits various control data using a control channel. The PHS terminal periodically receives the various control data via the control channel. When the PHS terminal changes its location, it receives the control data via a control channel of another base station which is most close to the PHS terminal. The PHS terminal is controlled in accordance with the control data.

Control Sequence for Originating Call

When a call key is turned on, the PHS terminal requests an assignment of a speech channel to the base station via the control channel. The base station assigns the speech channel in response to the speech channel assignment request and informs the PHS terminal of the assigned speech channel. The PHS terminal and the base station set various parameters of a call origination, a verification processing, or the like. When a called party responds, a communication with the called party starts (busy mode).

Control Sequence for Receiving Incoming Call

When the PHS terminal is called by another party, the base station informs the PHS terminal of the incoming call via the control channel. The PHS terminal requests an assignment of a speech channel to the base station via the control channel. The base station assigns the speech channel in response to the speech channel assignment request and informs the PHS terminal of the assigned speech channel. The PHS terminal and the base station set various parameters of an incoming call processing, a verification processing, or the like. When a user of the PHS terminal responds to the incoming call, a communication with the calling party starts (busy mode).

The operation of the CPU 18 in the operation mode changing process in the first embodiment will be described by reference to a flowchart in FIG. 4.

FIG. 4 is a flowchart for an interrupt operation related to the operation mode changing process started on reception of the control signal from the doorway base station 5.

When the power supply of the PHS terminal 1 has been turned on, the operation mode is set in the standby mode.

When the antenna 11 of the PHS terminal 1 receives the control signal from the doorway base station 5 (step S1), the operation mode changing process starts.

The control signal is sent as data through the aforementioned control system to the CPU 18.

If the antenna receives no control signal from the doorway base station 5, the CPU will not perform the operation mode changing process.

Receiving the control signal, the CPU 18 refers to the present mode table 22a stored in the RAM 22 and determines whether the present mode is the call enable mode, that is, the standby mode or the busy mode (step S2).

If the CPU 18 determines at step S2 that the operation mode is the standby mode or the busy mode, it is assumed that the PHS terminal 1 has entered the use inhibit area 3. Then, it is determined whether the present operation mode is the standby mode or not, referring to the present mode table 22a (step S3).

If the CPU 18 determines at step S3 that the operation mode is the standby mode, it is determined whether the change destination mode for which the flag data item has been set to "1" by the user is the sleep #1 mode, referring to the user-specified mode table 22b stored in the RAM 22 (step S4).

If the CPU 18 determines at step S3 that the operation mode is not the standby mode, it is assumed that the operation mode is the busy mode (step S5).

When the CPU 18 determines that the operation mode is the busy mode, it causes the speaker 16 to make an alarm sound or the display section 23 to display an alarm message, thereby informing the user that the user has entered the use inhibit area 3 (step S6).

The alarm informing devices employed at step S6 may utilize vibration or light.

After giving the alarm at step S6, the CPU 18 performs an on-hook process including the disconnection of the communication channel (step S7) and passes control to step S4.

When it is determined at step S4 that the operation mode is the sleep #1 mode, the CPU 18 changes the operation mode from the standby mode or the busy mode to the sleep #1 mode (step S8) and performs control in the sleep #1 mode. Specifically, the CPU 18 inhibits call originating, prevents notice of an incoming call and connection of a speech channel when there has been an incoming call, receives only the call incoming history information (including the date of incoming call and the calling party's telephone number), and stores the history information in a specific storage device, i.e., the table 22c in the RAM 22.

According to the above-described radio communication system, the method of controlling the system, and the radio communication terminal, it is possible to prevent call origination, generation of an incoming call tone, and a speech communication with regard to every PHS terminal 1 that enters the use inhibit area 3 and is set to the sleep #1 mode, regardless of the user's intentions.

If it is determined at step S4 that the operation mode is the sleep #2 mode, the CPU 18 changes the operation mode from the standby mode or the busy mode to the sleep #2 mode (step S9) and performs the control in the sleep #2 mode. Specifically, the CPU 18 will inhibit call origination and reception of an incoming call.

According to the above-mentioned radio communication system, the method of controlling the system, and the radio communication terminal, it is possible to prevent any PHS terminal 1 entering the use inhibit area 3 and set in the sleep #2 mode from radiating communication radio waves that might have an adverse effect on the instruments nearby, regardless of the user's intentions.

This eliminates the effect of radio waves on the instruments nearby in such a public place as a hospital.

If it is determined at step S2 that the operation mode is neither the standby mode nor the busy mode, or that the operation mode is the call inhibit mode, the CPU 18 determines that the user has left the use inhibit area 3 and changes the operation mode from the sleep #1 mode or the sleep #2 mode to the standby mode (step S10).

Next, the CPU 18 determines whether there had been an incoming call when the user was in the use inhibit area 3, on the basis of the table 22c in FIG. 3C (step S11).

If it is determined at step S11 that there had been an incoming call, the CPU 18 causes the speaker 16 to make an alarm sound and the display section 23 to display the call incoming history data on the basis of the call incoming history table 22c stored in the RAM 22 (step S12).

According to the above-described radio communication system, the method of controlling the system, and the radio communication terminal, the user can be saved the trouble of turning on the power supply on leaving the use inhibit area 3. Because the informing device notifies the user of the call incoming history information relating to the PHS terminal which was in the use inhibit area 3 on leaving the area 3, the user can know information on the incoming call to the user quickly.

If it is determined at step S11 that there had been no incoming call, the CPU 18 terminates the process.

As described above, with the PHS terminal 1 according to the first embodiment, the CPU 18, receiving the control signal from the doorway base station 5, detects the present mode, by referring to the present mode table 22a. If the present mode is the call enable mode, that is, the busy mode or the standby mode, it is assumed that the user has entered the use inhibit area 3. Especially in the case of the busy mode, the CPU 18 causes the speaker to make an alarm sound and the display section to display an alarm message that the user has entered the use inhibit area 3. Thereafter, the CPU 18 detects the change destination mode by referring to the user-specified mode table 22b, changes the mode of the PHS terminal 1 to the sleep #1 mode or sleep #2 mode, then performs incoming call receiving control and call originating control in the changed mode. In the case where the present mode is the call inhibit mode, that is, the sleep #1 mode or sleep #2 mode, when the CPU 18 receives the control signal, the CPU 18 determines that the user leaves the use inhibit area 3 and returns the mode of the PHS terminal to the standby mode and then performs incoming call receiving control and call originating control in the standby mode.

Second Embodiment

Hereinafter, a second embodiment of the present invention will be explained.

In the first embodiment, the doorway base station 5 has the same frequency band as that of the speech signal transmitted from a communication business base station or a private communication base station.

In contrast, in the second embodiment, the doorway base station 5 transmits a control signal whose frequency band differs from the above transmitted signal.

The radio communication system of the second embodiment has the same configuration as that of FIG. 1 except that the frequency band of the transmitted signal from the doorway base station 5 differs from the signal transmitted from a communication business radio base station or a private communication base station.

The control system in the second embodiment will be explained by reference to FIG. 5.

FIG. 5 is a circuit block diagram of the PHS terminal 1 in the second embodiment. The same component parts as those in the first embodiment will be indicated by the same reference symbols. Explanation of them will be omitted.

In FIG. 5, the PHS terminal 1 comprises an antenna 11, a radio-frequency section 12, a modem 13, a TDMA processing section 14, a speech processing section 15, a reception speaker 16, a microphone 17, a speaker 19, a key input section 20, a ROM 21, a RAM 22, a display section 23, a mode change signal receiving section 24, and a CPU 25.

The mode change signal receiving section 24 receives the control signal from the doorway base station 5 provided on the top of the doorway 4 and outputs the signal to the CPU 25.

When receiving the control signal from the mode change signal receiving section 24, the CPU 25 performs an operation mode changing process according to the procedure shown in FIG. 4 of the first embodiment.

According to the radio communication system, the method of controlling the system, and the radio communication terminal of the second embodiment, even when the signal transmitted from the doorway base station has a frequency band differing from that of the signal from a communication business base station or a private communication base station, the operation mode changing process can be similarly performed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the following modifications can be made.

(1) While in the first and second embodiments, only one doorway to the use inhibit area 3 has been provided, more than one doorway to the use inhibit area 3 may be provided. Furthermore, a first doorway for an entrance only and a second doorway for an exit only may be respectively provided. When these doorways are provided, a first base station that transmits a first control signal for changing the operation mode to the call inhibit mode may be provided at the entrance and a second base station that transmits a second control signal for changing the operation mode to the call enable mode may be provided at the entrance. Then, in response to only the first and second control signals, the operation mode of a terminal unit can be changed from the call inhibit mode to the call enable mode or vice versa. This eliminates the necessity for the determining steps as shown in FIG. 4, which simplifies control.

(2) Position judging means may be provided in base station or a center station ranking above the base station in the first and second embodiments. The signal the doorway base station 5 transmits to the PHS terminal 1 assumed to be in the use inhibit area 3 by the position judging means may be a control signal directly specifying the operation mode. Specifically, the PHS terminal may be designed to switch to the mode specified by the control signal, regardless of which mode the terminal is in when receiving the control signal from the doorway base station 5.

With this configuration, in such a place as a hospital where radio waves may have an adverse effect on the instruments nearby, using the signal from the doorway base station 5 as the control signal for the sleep #2 mode enables the radiation of the radio waves from the PHS terminal 1 to be shut off reliably.

(3) The PHS terminal 1 in the first embodiment may include recording/reproducing device. When the operation mode has been set to the sleep #1 mode, the PHS terminal 1 may record not only the history of incoming calls to itself but also a speech message relating to the incoming call. When the user has left the use inhibit area 3, the PHS terminal 1 may inform the user of an alarm notice that there is the recorded message and reproduce the recorded speech message by a specific operation.

With this configuration, after leaving the use inhibit area 3, the user can not only look at the call incoming history but also listen to the speech message.

(4) In the first embodiment, the doorway base station 5 may include a storage device and information on the call incoming history in the sleep #1 mode may be stored on the base station side. Specifically, the doorway base station 5 may be designed to be able to determine whether each PHS terminal 1 is in the use inhibit area 3 and information on the call incoming history of each PHS terminal 1 in the use inhibit area 3 may be stored on the doorway station 5 side, not on the PHS terminal 1 side. This enables the PHS terminal 1 in the use inhibit area 3 to perform control in the sleep #1 mode as in the sleep #2 mode. The information stored on the doorway base station 5 side may include not only the call incoming history information but also a speech message for an automatic answering machine. In this case, a specific operation in the busy mode outside the use inhibit area 3 establishes a speech channel between the PHS terminal 1 and the doorway base station 5, which enables the user to reproduce the speech message.

Further, this storage device for storing information on the call incoming history in the sleep #1 mode may be provided in an upper station of the doorway base station 5, i.e., so-called center station.

The recording of the call incoming history information on the doorway base station 5 side may be effected in any of the modes.

With such a configuration, even the sleep #1 mode prevents the radio waves from radiating in the use inhibit area 3 and therefore from having an adverse effect on the instruments nearby and enables the call incoming history to be recorded.

As described above, it is possible to provide a radio communication system that performs communication control suitable for applications, depending on the conditions, the method of controlling the radio communication system, and a radio communication terminal for use with the radio communication system.

What is claimed is:

1. A radio communication system comprising:
   a radio communication terminal; and
   a base station connected to said radio communication terminal via a radio channel;
   wherein said radio communication terminal can be operated in one of a plurality of operation modes, including at least: (i) a call enable mode in which call origination and incoming call reception are possible, and (ii) a call inhibit mode in which call origination is impossible;
   wherein said radio communication terminal comprises a receiver adapted to receive a control signal, a controller adapted to change the operation mode of said radio communication terminal based on said control signal received by said receiver, and a memory adapted to store call incoming history data indicating a call originating party and a call originating date of an incoming call;
   wherein said controller changes the operation mode of said radio communication terminal from the call enable mode to the call inhibit mode upon receipt of the control signal by said receiver; and
   wherein, in the call inhibit mode, speech communication in response to an incoming call is inhibited and the call incoming history data of the incoming call is written into said memory.

2. The radio communication system according to claim 1, wherein said base station transmits the control signal to said radio communication terminal.

3. A radio communication system according to claim 2, wherein:
   said base station transmits a second control signal to said radio communication terminal when said radio communication terminal exits from a use inhibit area where use of said radio communication terminal is inhibited; and
   said controller changes the operation mode of said radio communication terminal from the call inhibit mode to the call enable mode upon receipt of the second control signal by said receiver.

4. A radio communication system according to claim 3, wherein said base station is provided at a doorway to the use inhibit area.

5. A radio communication system according to claim 1, wherein, in the call inhibit mode, said control signal can still be received, and wherein upon receipt of the control signal by said receiver in the call inhibit mode said controller changes the operation mode of said radio communication terminal from the call inhibit mode to the call enable mode.

6. A radio communication system according to claim 1, wherein:
   said radio communication terminal comprises a display device; and
   said display device, when said radio communication terminal is in the call inhibit mode, displays a message or a mark indicating that the radio communication terminal is within the use inhibit area, continuously until said receiver again receives said control signal or temporarily upon a call originating operation.

7. A radio communication system according to claim 1, wherein:
   said radio communication terminal comprises an informing device that provides an alarm notice indicating that the radio communication terminal has entered the use inhibit area; and
   when said radio communication terminal has entered the use inhibit area in a case where said radio communication terminal is busy when the receiver receives the control signal, an alarm notice is issued and said controller changes the operation mode of said radio communication terminal from the call enable mode to the call inhibit mode, and then said controller performs a call terminating process.

8. A radio communication system according to claim 1, wherein:
   said radio communication terminal comprises an informing device; and
   when the operation mode of said radio communication terminal is the call inhibit mode and said receiver receives said control signal, said controller changes the operation mode to the call enable mode, reads the call incoming history data from said memory, and causes said informing device to indicate the call incoming history data when there has been an incoming call while said radio communication terminal was in said call inhibit mode.

9. A method of controlling a radio communication system comprising a radio communication terminal and a base station connected to said radio communication terminal via a radio channel, said method comprising:

transmitting to said radio communication terminal a control signal for controlling an operation mode of said radio communication terminal when said radio communication terminal enters into a use inhibit area where use of said radio communication terminal is inhibited;

changing the operation mode of said radio communication terminal from a call enable mode to a call inhibit mode upon receipt of the control signal by said radio communication terminal, wherein in the call enable mode call origination and incoming call reception are possible and in the call inhibit mode call origination and incoming call reception are impossible;

storing call incoming history data indicating a call originating party and a call origination date of an incoming call in a system memory without calling said radio communication terminal while said radio communication terminal is in the call inhibit mode; and controlling said radio communication terminal to read the call incoming history data after said radio communication terminal has left the use inhibit area.

10. The method according to claim 9, wherein said base station transmits the control signal to said radio communication terminal.

11. A radio communication terminal comprising:

a receiver adapted to receive a control signal for controlling an operation mode of said radio communication terminal;

a controller adapted to change the operation mode of said radio communication terminal in response to said control signal received by said receiver, wherein the operation mode of said radio communication terminal may be at least one of: (i) a call enable mode in which call origination and incoming call reception are possible, and (ii) a call inhibit mode in which call origination is impossible; and a memory;

wherein said controller changes the operation mode of said radio communication terminal from the call enable mode to the call inhibit mode upon receipt of the control signal by said receiver; and wherein, when said radio communication terminal is in the call inhibit mode, speech communication in response to an incoming call is inhibited and said radio communication terminal writes call incoming history data indicating a call originating party and a call originating date of the incoming call into said memory.

12. A radio communication terminal according to claim 11, wherein:

said controller changes the operation mode of said radio communication terminal between the call inhibit mode and the call enable mode when said receiver receives said control signal.

13. A radio communication terminal according to claim 11, wherein, in the call inhibit mode, said control signal can still be received, and wherein upon receipt of the control signal by said receiver in the call inhibit mode said controller changes the operation mode of said radio communication terminal from the call inhibit mode to the call enable mode.

14. A radio communication terminal according to claim 11, further comprising a display device; and wherein said display device, when said radio communication terminal is in the call inhibit mode, displays a message or a mark indicating that the radio communication terminal is within the use inhibit area, continuously until said receiver receives said control signal again or temporarily upon a call originating operation.

15. A radio communication terminal according to claim 11, further comprising an informing device that provides an alarm notice indicating that the radio communication terminal has entered the use inhibit area; and wherein, when said radio communication terminal has entered the use inhibit area in a case where said radio communication terminal is busy when said receiver receives said control signal, said informing device provides the alarm notice and said controller changes the operation mode of said radio communication terminal to the call inhibit mode.

16. A radio communication terminal according to claim 15, wherein a call terminating process is performed after said informing device provides the alarm notice.

17. A radio communication terminal according to claim 11, further comprising an informing device; and wherein when the operation mode of said radio communication terminal is the call inhibit mode and said receiver receives said control signal, said controller changes the operation mode to the call enable anode, reads the call incoming history data from said memory, and causes said informing device to indicate the call incoming history data when there has been an incoming call while said radio communication terminal was in said call inhibit mode.

18. A radio communication terminal according to claim 11, further comprising a recording/reproducing device, adapted to record a speech message at least when the radio communication terminal is in the call inhibit mode.

19. The method according to claim 11, wherein said receiver receives the control signal transmitted from said base station.

20. A radio communication system comprising:

a radio communication terminal;

a base station connected to said radio communication terminal via a radio channel;

a detector adapted to detect a position of the radio communication terminal;

a processor adapted to determine whether or not the radio communication terminal is in a use inhibit area; and a memory;

wherein said base station does not call the radio communication terminal when there is an incoming call to the radio communication terminal if the processor has determined that the radio communication terminal is in the use inhibit area, and then writes call incoming history data indicating a call originating party and a call origination date of the incoming call into the memory; and wherein said call incoming history data stored in the memory is read by the radio communication terminal after the radio communication terminal has left the use inhibit area.

21. A method of controlling a radio communication system comprising a radio communication terminal and a base station connected to said radio communication terminal via a radio channel, said method comprising:

transmitting to said radio communication terminal a control signal for controlling an operation mode of said radio communication terminal when said radio communication terminal enters into a use inhibit area;

changing the operation mode of said radio communication terminal from a call enable mode to a call inhibit mode upon receipt of the control signal by said radio communication terminal, wherein in the call enable mode call origination and incoming call reception are possible and in the call inhibit mode call origination and incoming call reception are impossible;

storing call incoming history data indicating a call originating party and a call origination data of an incoming call without establishing a speech channel between the radio communication terminal and the base station when there is an incoming call to the radio communication terminal while said radio communication terminal is in the call inhibit mode.

22. A method of controlling a radio communication system comprising a radio communication terminal and a base station connected to said radio communication terminal via a radio channel, said method comprising:

transmitting from said base station to said radio communication terminal a control signal for controlling an operation of said radio communication terminal when said radio communication terminal enters into a use inhibit area where use of said radio communication terminal is inhibited;

changing an operation mode of said radio communication terminal from a call enable mode in which a call origination and an incoming call reception are possible to a call inhibit mode in which a call origination and an incoming call reception are impossible upon receipt of the control signal by said radio communication terminal;

storing call incoming history data indicating a call originating party and a call origination data of an incoming call in a system memory without calling said radio communication terminal while said radio communication terminal is in the call inhibit mode; and controlling said radio communication terminal to read the call incoming history data after said radio communication terminal has left the use inhibit area.

* * * * *